United States Patent
Chung et al.

(10) Patent No.: US 10,417,375 B2
(45) Date of Patent: Sep. 17, 2019

(54) TIME-DRIVEN PLACEMENT AND/OR CLONING OF COMPONENTS FOR AN INTEGRATED CIRCUIT

(71) Applicant: International Business Machines Corporation, Armonk, NY (US)

(72) Inventors: Woohyun Chung, Daejeon (KR); Gi-Joon Nam, Chappaqua, NY (US); Lakshmi N. Reddy, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 15/689,791

(22) Filed: Aug. 29, 2017

(65) Prior Publication Data
US 2019/0065655 A1 Feb. 28, 2019

(51) Int. Cl.
*G06F 17/50* (2006.01)
*G06F 9/44* (2018.01)
*G06F 16/27* (2019.01)

(52) U.S. Cl.
CPC ............ *G06F 17/5081* (2013.01); *G06F 9/44* (2013.01); *G06F 16/275* (2019.01); *G06F 17/5022* (2013.01); *G06F 17/5045* (2013.01); *G06F 17/5072* (2013.01)

(58) Field of Classification Search
USPC ........................................................ 716/112
See application file for complete search history.

(56) References Cited

U.S. PATENT DOCUMENTS

| | | | |
|---|---|---|---|
| 5,904,572 A | 5/1999 | Lee et al. | |
| 6,163,877 A * | 12/2000 | Gupta | G06F 17/5068 716/122 |
| 7,013,438 B1 | 3/2006 | Saldanha et al. | |
| 7,395,524 B2 | 7/2008 | Roesner et al. | |
| 7,549,137 B2 | 6/2009 | Alpert et al. | |
| 7,865,855 B2 | 1/2011 | Koehl et al. | |
| 8,443,313 B2 | 5/2013 | Ward et al. | |

(Continued)

OTHER PUBLICATIONS

Cho, "LatchPlanner: Latch Placement Algorithm for Datapath-oriented High-Performance VLSI Designs," Last Accessed: Aug. 11, 2017, 7 Pages.

(Continued)

*Primary Examiner* — Bryce M Aisaka
(74) *Attorney, Agent, or Firm* — Amin, Turocy & Watson, LLP

(57) ABSTRACT

Techniques that facilitate time-driven placement and/or cloning of components for an integrated circuit are provided. In one example, a system includes an analysis component, a geometric area component and a placement component. The analysis component computes timing information and distance information between a set of transistor components of an integrated circuit. The geometric area component determines at least a first geometric area of the integrated circuit and a second geometric area of the integrated circuit based on the timing information and the distance information. The placement component determines a location for a latch component on the integrated circuit based on an intersection between the first geometric area and the second geometric area.

14 Claims, 12 Drawing Sheets

(56) References Cited

U.S. PATENT DOCUMENTS 10,083,269 B2  9/2018  De Dood et al.
2006/0150132 A1  7/2006  Gupta

OTHER PUBLICATIONS

Venkataraman, "Integrated Placement and Skew Optimization for Rotary Clocking," IEEE Transactions on Very Large Scale Integration (VLSI) Systems, vol. 15, No. 2, Feb. 2007, 10 pages.
Jayakrishnan, "Slack-aware Timing Margin Redistribution Technique Utilizing Error Avoidance Flip-Flops and Time Borrowing," Last Accessed: Aug. 11, 2017, 6 pages.
IBM, "System and Method for Timing Optimization using Latch Cloning through Statistical Selection," Original Publication Date: Feb. 5, 2009, 4 pages.
Garbers, "VLSI-Placement Based on Routing and Timing Information," Last Accessed: Aug. 11, 2017, 5 pages.
List of IBM Patents or Applications to be treated as related.
Non-Final Office Action received for U.S. Appl. No. 15/842,179 dated May 22, 2019, 15 pages.

* cited by examiner

TIME-DRIVEN PLACEMENT AND/OR CLONING OF COMPONENTS FOR AN INTEGRATED CIRCUIT

BACKGROUND

The subject disclosure relates to integrated circuits, and more specifically, to physical design of an integrated circuit.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate time-driven placement and/or cloning of components for an integrated circuit are described.

According to an embodiment, a system can comprise an analysis component, a geometric area component and a placement component. The analysis component can compute timing information and distance information between a set of transistor components of an integrated circuit. The geometric area component can determine at least a first geometric area of the integrated circuit and a second geometric area of the integrated circuit based on the timing information and the distance information. The placement component can determine a location for a latch component on the integrated circuit based on an intersection between the first geometric area and the second geometric area.

According to another embodiment, a computer-implemented method is provided. The computer-implemented method can comprise determining, by a system operatively coupled to a processor, timing information and distance information associated with a set of transistors of an integrated circuit. The computer-implemented method can also comprise determining, by the system, at least a first geometric area of the integrated circuit and a second geometric area of the integrated circuit based on the timing information and the distance information. Furthermore, the computer-implemented method can comprise determining, by the system, a location for a sequencing element on the integrated circuit based on an intersection between the first geometric area and the second geometric area.

According to yet another embodiment, a computer program product for improving design of an integrated circuit can comprise a computer readable storage medium having program instructions embodied therewith. The program instructions can be executable by a processor and cause the processor to determine, by the processor, timing information and distance information associated with a set of transistors for an integrated circuit layout associated with an integrated circuit. The program instructions can also cause the processor to determine, by the processor, at least a first geometric area of the integrated circuit layout and a second geometric area of the integrated circuit layout based on the timing information and the distance information. Furthermore, program instructions can also cause the processor to determine, by the processor, a location for a sequencing element on the integrated circuit layout based on an intersection between the first geometric area and the second geometric area.

DETAILED DESCRIPTION

Figure 1:
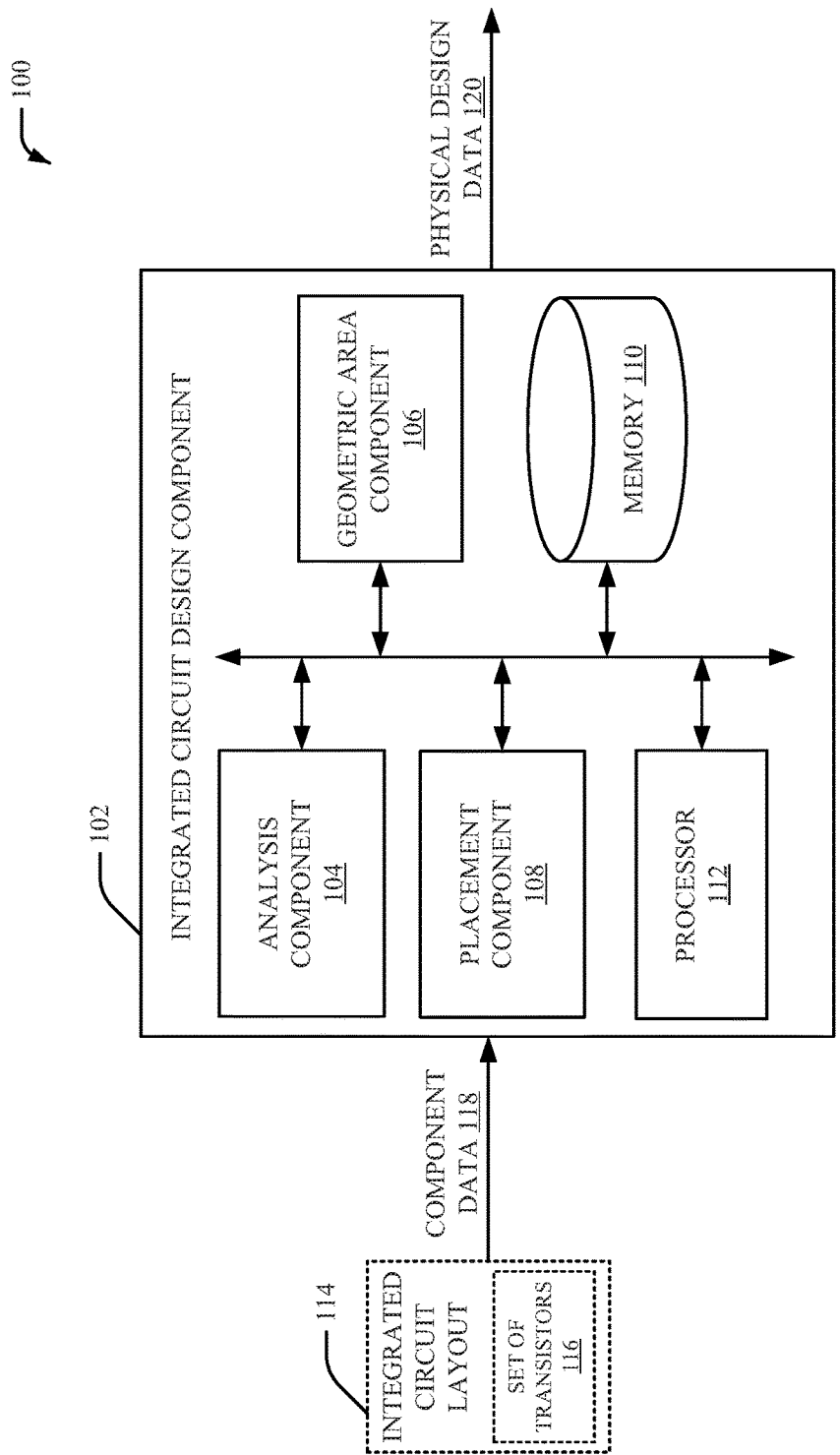
FIG. 1 illustrates a block diagram of an example, non-limiting system that includes an integrated circuit design component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

An integrated circuit includes a set of transistor circuits formed on semiconductor material. For instance, an integrated circuit can be formed by combining thousand of transistors into a semiconductor computer chip. Design of an integrated circuit generally involves numerous processes such as an architectural design process, a functional design and logic design process, a circuit design process, a physical design process, a fabrication process, etc. The physical design process generally includes partitioning, floorplanning, placement, clock tree synthesis, signal routing and/or timing closure related to physical design of an integrated circuit. Placement of components generally has significant implications for timing associated with design of an integrated circuit. For instance, placement of components on an integrated circuit is often determined based on a wire-length between components. However, placement of components on an integrated circuit based on a wire-length between components often leads to inefficiencies and/or performance limitations associated with the integrated circuit.

Embodiments described herein include systems, computer-implemented methods, and computer program products that facilitate time-driven placement and/or cloning of components for an integrated circuit. For example, time-driven placement of a latch component on an integrated circuit and/or time-driven cloning of a latch component on an integrated circuit can be achieved to facilitate optimized timing characteristics of an integrated circuit. A latch component can be sequencing circuit element that stores state information associated with sequential logic for a digital system. In an aspect, unified timing-driven placement and/or cloning of a latch component can be achieved. For instance, an optimal location for a latch component on an integrated circuit can be determined. Additionally or alternatively, a latch component can be cloned. The latch component can drive a first portion of an integrated circuit (e.g., a first group of fanout gates that provide output to one or more gate inputs). Furthermore, a cloned latch component can drive a second portion of the integrated circuit (e.g., a second group of fanout gates that provide output to one or more gate inputs). In an embodiment, timing information and distance information between a set of transistor components of an integrated circuit can be computed. In an aspect, timing information and distance information between a set of transistor components of an integrated circuit can be computed during a circuit design process for the integrated circuit. In one example, a slack timing value can be computed between transistor components of an integrated circuit. A slack timing value can be indicative of a difference between an actual time and a desired time for a timing path between a first transistor component and a second transistor component. In another example, a pair-wise distance can be computed between a first transistor component and a second transistor component. Additionally, at least a first geometric area of the integrated circuit and a second geometric area of the integrated circuit can be determined based on the timing information and the distance information. Furthermore, a location of a latch component on the integrated circuit can be determined based on an intersection between the first geometric area and the second geometric area. As such, an optimal location of a latch component on an integrated circuit can be determined, performance of the integrated circuit can be improved, efficiency of the integrated circuit can be improved, timing characteristics of the integrated circuit can be improved, and/or power characteristics of the integrated circuit can be improved. In another embodiment, the latch component can be cloned to generate a cloned latch component. The cloned latch component can drive a portion of the set of transistors of the integrated circuit. As such, timing characteristics of the integrated circuit can be further improved.

FIG. 1 illustrates a block diagram of an example, non-limiting system 100 that facilitates time-driven placement and/or cloning of components for an integrated circuit in accordance with one or more embodiments described herein. In various embodiments, the system 100 can be a design system associated with technologies such as, but not limited to, circuit technologies, integrated circuit technologies, very-large-scale integration (VLSI) technologies, semiconductor technologies, processor technologies, hardware technologies, digital technologies, machine learning technologies, and/or other digital technologies. The system 100 can employ hardware and/or software to solve problems that are highly technical in nature, that are not abstract and that cannot be performed as a set of mental acts by a human. Further, in certain embodiments, some of the processes performed may be performed by one or more specialized computers (e.g., one or more specialized processing units, a specialized computer with an integrated circuit design component component, etc.) for carrying out defined tasks related to machine learning. The system 100 and/or components of the system 100 can be employed to solve new problems that arise through advancements in technologies mentioned above, computer architecture, and/or the like. One or more embodiments of the system 100 can provide technical improvements to circuit design systems, integrated circuit systems, VLSI systems, semiconductor systems, processor systems, hardware systems, digital systems, fabrication systems, machine learning systems, and/or other systems. One or more embodiments of the system 100 can also provide technical improvements to a processing unit (e.g., a processor) and/or an integrated circuit by improving processing performance of the integrated circuit, improving processing efficiency of the integrated circuit, improving timing characteristics of the integrated circuit and/or improving power efficiency of the integrated circuit.

In the embodiment shown in FIG. 1, the system 100 can include an integrated circuit design component 102. As shown in FIG. 1, the integrated circuit design component 102 can include an analysis component 104, a geometric area component 106, and a placement component 108. Aspects of the integrated circuit design component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the integrated circuit design component 102 can also include memory 110 that stores computer executable components and instructions. Furthermore, the integrated circuit design component 102 can include a processor 112 to facilitate execution of the instructions (e.g., computer executable components and corresponding instructions) by the integrated circuit design component 102. As shown, the analysis component 104, the geometric area component 106, the placement component 108, the memory 110 and/or the processor 112 can be electrically and/or communicatively coupled to one another in one or more embodiments. In an embodiment, the system 100 can further include an integrated circuit layout 114. The integrated circuit layout 114 can be a geometric representation of an integrated circuit that includes at least a set of transistors 116. The set of transistors 116 can be, for example, a set of transistor components that are semiconductor devices employed to modify electronic signals associated with the integrated circuit.

The analysis component 104 can employ component data 118 to analyze one or more characteristics of the integrated circuit layout 114 (e.g., one or more characteristics associated with the set of transistors 116). For instance, the component data 118 can include information associated with the set of transistors 116 such as, for example, a location of the set of transistors 116 on the integrated circuit layout 114, interconnections between the set of transistors 116, a total number of transistors included in the set of transistors 116, specification information for the set of transistors 116 and/or other information associated with the set of transistors 116. In an aspect, the analysis component 104 can compute timing information between the set of transistors 116 of the integrated circuit layout 114 associated with the integrated circuit. For instance, the analysis component 104 can estimate delay between the set of transistors 116 of the integrated circuit layout 114 associated with the integrated circuit. The analysis component 104 can employ the component data 118 to compute the timing information. In an embodiment, the analysis component 104 can employ a linear delay model of the integrated circuit layout 114 associated with the integrated circuit to determine the timing information. For example, the analysis component 104 can employ a linear delay model of the integrated circuit layout 114 associated with the integrated circuit to calculate interconnect delay between the set of transistors 116 of the integrated circuit layout 114 associated with the integrated circuit. The linear delay model can be a model that predicts linear delay for a network of connections on the integrated circuit layout 114 associated with the integrated circuit. The linear delay can be linearly proportional to wire length with a scaling coefficient that is dependent on a metal layer of the integrated circuit layout 114 associated with the integrated circuit. The metal layer can be a layer of the integrated circuit layout 114 associated with the integrated circuit that is employed for routing of a network of connections on the integrated circuit layout 114 associated with the integrated circuit. The linear delay model can also be a model that predicts impact of placement of future components on the integrated circuit layout 114 associated with the integrated circuit. For instance, the linear delay model can account for one or more buffer components to be inserted on the integrated circuit layout 114 and/or can estimate buffering-aware interconnect delay in response to the one or more buffer components.

Additionally or alternatively, the analysis component 104 can compute distance information between the set of transistors 116 of the integrated circuit layout 114 associated with the integrated circuit. For instance, the analysis component 104 can determine a wire length between the set of transistors 116 of the integrated circuit layout 114 associated with the integrated circuit. The analysis component 104 can employ the component data 118 to compute the distance information. In an embodiment, the analysis component 104 can employ a Manhattan distance technique to determine the distance information for the integrated circuit layout 114 associated with the integrated circuit. For instance, a Manhattan distance technique can be employed to estimate wire-lengths between the set of transistors 116 of the integrated circuit layout 114 associated with the integrated circuit. A Manhattan distance technique can employ a grid of horizontal paths and/or vertical paths to determine distance (e.g., wire-lengths) between the set of transistors 116 of the integrated circuit layout 114 associated with the integrated circuit. The Manhattan distance technique can compute a sum of horizontal paths and/or vertical paths to determine distance (e.g., wire-lengths) between the set of transistors 116 of the integrated circuit layout 114 associated with the integrated circuit.

In an embodiment, the analysis component 104 can compute the timing information and/or the distance information based on classifications, correlations, inferences and/or expressions associated with principles of artificial intelligence. For instance, the analysis component 104 can employ an automatic classification system and/or an automatic classification process to calculate the timing information and/or the distance information. In one example, the analysis component 104 can employ a probabilistic and/or statistical-based analysis (e.g., factoring into the analysis utilities and costs) to learn and/or generate inferences with respect to the timing information and/or the distance information. In an aspect, the analysis component 104 can include an inference component (not shown) that can further enhance automated aspects of the analysis component 104 utilizing in part inference based schemes to facilitate learning and/or generating inferences associated with the timing information and/or the distance information. The analysis component 104 can employ any suitable machine-learning based techniques, statistical-based techniques and/or probabilistic-based techniques. For example, the analysis component 104 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the analysis component 104 can perform a set of machine learning computations associated with calculation of the timing information and/or the distance information. For example, the analysis component 104 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to obtain the timing information and/or the distance information.

The geometric area component 106 can determine at least a first geometric area of the integrated circuit layout 114 associated with the integrated circuit and a second geometric area of the integrated circuit layout 114 associated with the integrated circuit. The geometric area component 106 can determine the first geometric area and the second geometric area based on the timing information and the distance information. In one example, the first geometric area can be a first diamond shape and the second geometric area can be a second diamond shape. The first geometric area can be associated with a first transistor (e.g., a first gate) from the set of transistors 116 and the second geometric area can be associated with a second transistor (e.g., a second gate) from the set of transistors 116. For instance, the first transistor (e.g., the first gate) can be located at a center of the first geometric area and the second transistor (e.g., the second gate) can be located at a center of the second geometric area. The geometric area component 106 can determine a first size for the first geometric area and a second size of the second geometric area based on the timing information and the distance information. In one example, the first size can be different than the second size. In another example, the first size can correspond to the second size. In an aspect, the geometric area component 106 can determine a first initial size for the first geometric area and a second initial size of the second geometric area based on the timing information and the distance information. The geometric area component 106 can also modify the first initial size for the first geometric area and the second initial size of the second geometric area. For example, the geometric area component 106 can incrementally increase the first initial size for the first geometric area and the second initial size of the second geometric area until the first geometric area and the second geometric area become abutted and/or intersect.

In an embodiment, the geometric area component 106 can determine the first geometric area associated with the integrated circuit and/or the second geometric area associated with the integrated circuit based on classifications, correlations, inferences and/or expressions associated with principles of artificial intelligence. For instance, the geometric area component 106 can employ an automatic classification system and/or an automatic classification process to determine the first geometric area associated with the integrated circuit and/or the second geometric area associated with the integrated circuit. In one example, the geometric area component 106 can employ a probabilistic and/or statistical-based analysis (e.g., factoring into the analysis utilities and costs) to learn and/or generate inferences with respect to the first geometric area associated with the integrated circuit and/or the second geometric area associated with the integrated circuit. In an aspect, the geometric area component 106 can include an inference component (not shown) that can further enhance automated aspects of the geometric area component 106 utilizing in part inference based schemes to facilitate learning and/or generating inferences associated with the first geometric area associated with the integrated circuit and/or the second geometric area associated with the integrated circuit. The geometric area component 106 can employ any suitable machine-learning based techniques, statistical-based techniques and/or probabilistic-based techniques. For example, the geometric area component 106 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the geometric area component 106 can perform a set of machine learning computations associated with determining the first geometric area associated with the integrated circuit and/or the second geometric area associated with the integrated circuit. For example, the geometric area component 106 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to determine the first geometric area associated with the integrated circuit and/or the second geometric area associated with the integrated circuit.

The placement component 108 can determine a location for a latch component on the integrated circuit layout 114 associated with the integrated circuit based on an intersection between the first geometric area and the second geometric area. For instance, the latch component can be placed at a location on the integrated circuit (e.g., the integrated circuit layout 114 associated with the integrated circuit) where a first side of the first geometric area and a second side of the second geometric area abuts. A latch component can be a sequencing circuit element that stores state information associated with sequential logic for a digital system. The placement component 108 can generate physical design data 120 based on one or more locations for one or more latch components determined by the placement component 108. For example, the physical design data 120 can include a location for one or more latch components on the integrated circuit layout 114 associated with the integrated circuit. In an embodiment, the analysis component 104 can determine a slack timing value between the set of transistors 116 that satisfies a defined criterion. A slack timing value that satisfies a defined criterion can be, for example, an optimal slack timing value (e.g., a slack timing value with a lowest value) between the set of transistors 116. A slack timing value can be indicative of a difference between an actual time and a desired time for a timing path between a first transistor and a second transistor from the set of transistors 116. Furthermore, the geometric area component 106 can determine at least the first geometric area of the integrated circuit and the second geometric area of the integrated circuit based on the slack timing value. For example, the first size for the first geometric area and the second size for the geometric area can be determined based on the slack timing value. In another embodiment, the geometric area component 106 can determine a total number of geometric areas of the integrated circuit based on a total number of transistors included in the set of transistors 116. For example, a first geometric area can correspond to a first transistor from the set of transistors 116, a second geometric area can correspond to a second transistor from the set of transistors 116, a third geometric area can correspond to a third transistor from the set of transistors 116, etc. In yet another embodiment, the geometric area component 106 can determine a total number of geometric areas of the integrated circuit based on the timing information and the distance information. For example, a total number of geometric areas of the integrated circuit can be increased or decreased based on the timing information and the distance information. In an aspect, the first geometric area can comprise a first portion of transistors from the set of transistors 116 and the second geometric area can comprise a second portion of transistors from the set of transistors 116.

In certain embodiments, the placement component 108 can generate a user interface to display at least a portion of the physical design data 120 and/or the integrated circuit layout 114 in a human interpretable format. For example, the placement component 108 can generate a user interface to display, in a human interpretable format, the physical design data 120 and/or the integrated circuit layout 114. Moreover, in certain embodiments, the placement component 108 can transmit the physical design data 120 to one or more computing devices (e.g., one or more computing devices associated with a display) via a network such as, but not limited to, a local area networks (LAN), a wide area network (WAN) such as the Internet, and/or a network that provides interconnections for devices associated with a defined workspace. The one or more computing devices can include, for example, a computing device, a computer, a desktop computer, a laptop computer, a monitor device, a smart device, a smart phone, a mobile device, a handheld device, a tablet, a wearable device, a portable computing device or another type of device associated with a display. As such, an optimal location of a latch component on an integrated circuit associated with the integrated circuit layout 114 can be determined, performance of an integrated circuit associated with the integrated circuit layout 114 can be improved, efficiency of an integrated circuit associated with the integrated circuit layout 114 can be improved, timing characteristics of an integrated circuit associated with the integrated circuit layout 114 can be improved, and/or power characteristics of an integrated circuit associated with the integrated circuit layout 114 can be improved.

It is to be appreciated that the integrated circuit design component 102 (e.g., the analysis component 104, the geometric area component 106, the placement component 108, the timing component 202, the distance component 204, the slack component 302 and/or the cloning component 402) performs time-driven placement and/or cloning of components for an integrated circuit that cannot be performed by a human (e.g., is greater than the capability of a single human mind). For example, an amount of data processed, a speed of data processed and/or data types of data processed by the integrated circuit design component 102 (e.g., the analysis component 104, the geometric area component 106, the placement component 108, the timing component 202, the distance component 204, the slack component 302 and/or the cloning component 402) over a certain period of time can be greater, faster and different than an amount, speed and data type that can be processed by a single human mind over the same period of time. The integrated circuit design component 102 (e.g., the analysis component 104, the geometric area component 106, the placement component 108, the timing component 202, the distance component 204, the slack component 302 and/or the cloning component 402) can also be fully operational towards performing one or more other functions (e.g., fully powered on, fully executed, etc.) while also performing the above-referenced time-driven placement and/or cloning of components for an integrated circuit. Moreover, physical design data (e.g., physical design data 120) generated by the integrated circuit design component 102 (e.g., the analysis component 104, the geometric area component 106, the placement component 108, the timing component 202, the distance component 204, the slack component 302 and/or the cloning component 402) can include information that is impossible to obtain manually by a user. For example, a type of information included in the physical design data (e.g., physical design data 120), a variety of information included in the physical design data (e.g., physical design data 120), and/or optimization of the physical design data (e.g., physical design data 120) can be more complex than information obtained manually by a user.

Figure 2:
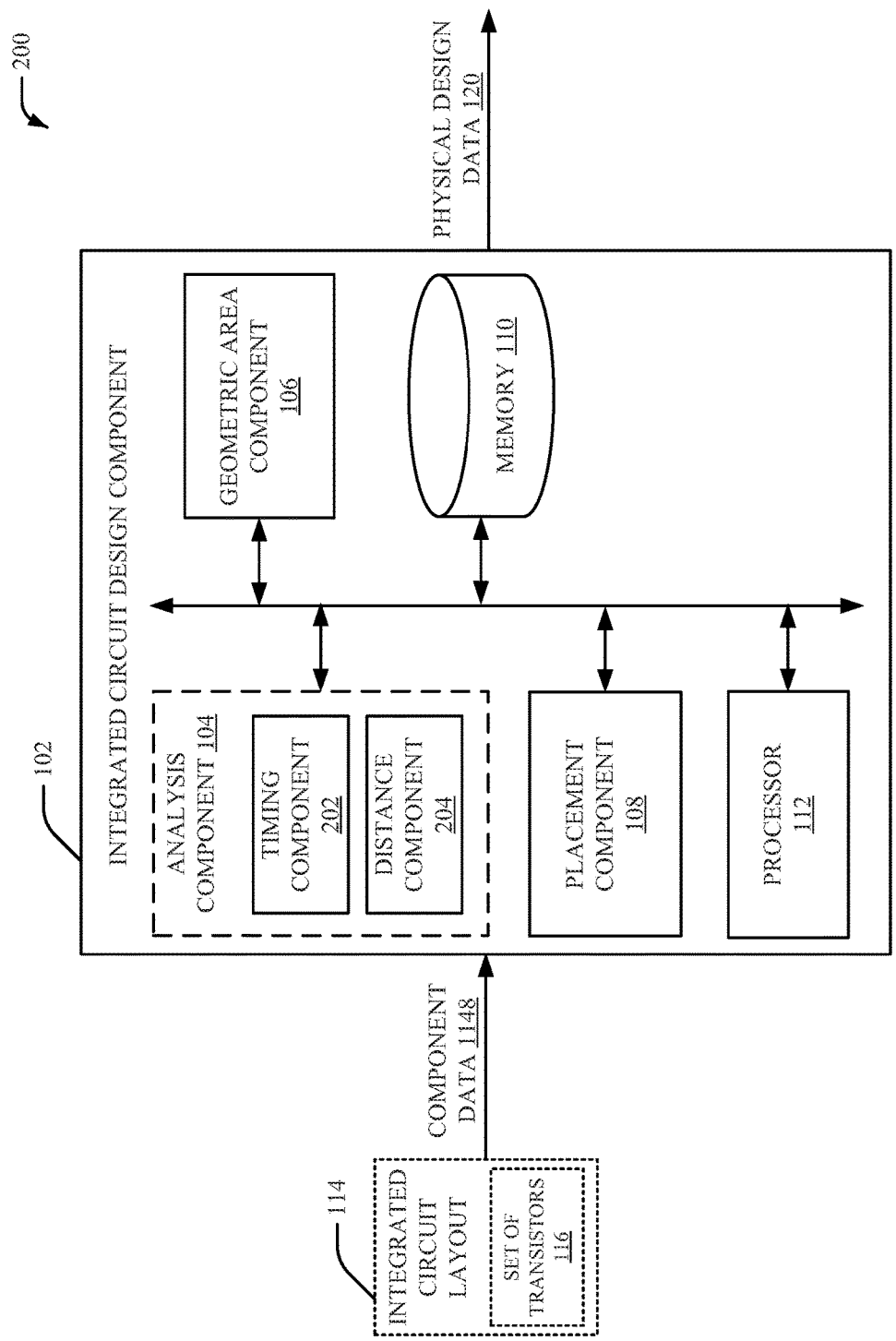
FIG. 2 illustrates a block diagram of another example, non-limiting system that includes an integrated circuit design component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the integrated circuit design component 102. In certain embodiments, the system 200 also includes the integrated circuit layout 114. The integrated circuit design component 102 can include the analysis component 104, the geometric area component 106, the placement component 108, the memory 110 and/or the processor 112. As shown in FIG. 2, the analysis component 104 can include a timing component 202 and/or a distance component 204.

The timing component 202 can compute timing information between the set of transistors 116 of the integrated circuit layout 114 associated with the integrated circuit. In an aspect, the timing information can include a pair-wise comparison of times between transistors from the set of transistors 116. For instance, the timing component 202 can compute first timing information between a first transistor and a second transistor from the set of transistors 116, second timing information between a third transistor and a fourth transistor from the set of transistors 116, third timing information between a fifth transistor and a sixth transistor from the set of transistors 116, etc. The timing information can include, for example, a slack value indicative of a difference between an actual time and a desired time for a timing path between the set of transistors 116 of the integrated circuit layout 114 associated with the integrated circuit. In a non-limiting example, the timing component 202 can compute a slack time between a source component and a sink component (e.g., source/sink pairs) associated with the set of transistors 116. A source component can be a transistor that provides a current a sink component can be a transistor that receives a current.

In an embodiment, the timing component 202 can generate a linear delay model of the integrated circuit layout 114 associated with the integrated circuit. For example, the timing component 202 can generate a linear delay model of the integrated circuit layout 114 associated with the integrated circuit to facilitate calculation of interconnect delay between the set of transistors 116 of the integrated circuit layout 114 associated with the integrated circuit. The linear delay model can be a model that predicts linear delay for a network of connections on the integrated circuit layout 114 associated with the integrated circuit. The linear delay can be linearly proportional to wire length with a scaling coefficient that is dependent on properties of a metal layer of the integrated circuit layout 114 associated with the integrated circuit. The metal layer can be a layer of the integrated circuit layout 114 associated with the integrated circuit that is employed for routing of a network of connections on the integrated circuit layout 114 associated with the integrated circuit. Additionally or alternatively, the timing component 202 can predict impact of placement of future components on the integrated circuit layout 114 associated with the integrated circuit. For instance, the timing component 202 can predict linear delay by accounting for one or more buffer components to be inserted on the integrated circuit layout 114. In certain embodiments, the timing component 202 can predict impact of placement of future components on the integrated circuit layout 114 based on classifications, correlations, inferences and/or expressions associated with principles of artificial intelligence. For example, the timing component 202 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to predict impact of placement of future components on the integrated circuit layout 114.

The distance component 204 can compute distance information between the set of transistors 116 of the integrated circuit layout 114 associated with the integrated circuit. In an aspect, the distance information can include pair-wise distances between transistors from the set of transistors 116. For instance, the distance component 204 can compute first distance information between a first transistor and a second transistor from the set of transistors 116, second distance information between a third transistor and a fourth transistor from the set of transistors 116, third distance information between a fifth transistor and a sixth transistor from the set of transistors 116, etc. The timing information can include, for example, a wire length value indicative of a length of a wire between the set of transistors 116 of the integrated circuit layout 114 associated with the integrated circuit. A wire can be, for example, a physical electrical connection (e.g., copper line, an aluminum line, a metallic trace, etc.) between a first transistor from the set of transistors 116 and a second transistor from the set of transistors 116. In a non-limiting example, wire length can be a length of a wire between a source component and a sink component (e.g., source/sink pairs) associated with the set of transistors 116. In an embodiment, the distance component 204 can employ a Manhattan distance technique to compute the distance information. For example, the distance component 204 can employ a Manhattan distance technique to compute a length of wire between the set of transistors 116 of the integrated circuit layout 114 associated with the integrated circuit. A Manhattan distance technique can compute distance based on a grid of horizontal paths and/or vertical paths between the set of transistors 116 of the integrated circuit layout 114 associated with the integrated circuit. In one example, the Manhattan distance technique can compute a sum of horizontal paths and/or vertical paths to determine distance information (e.g., wire-lengths) between the set of transistors 116 of the integrated circuit layout 114 associated with the integrated circuit.

Figure 3:
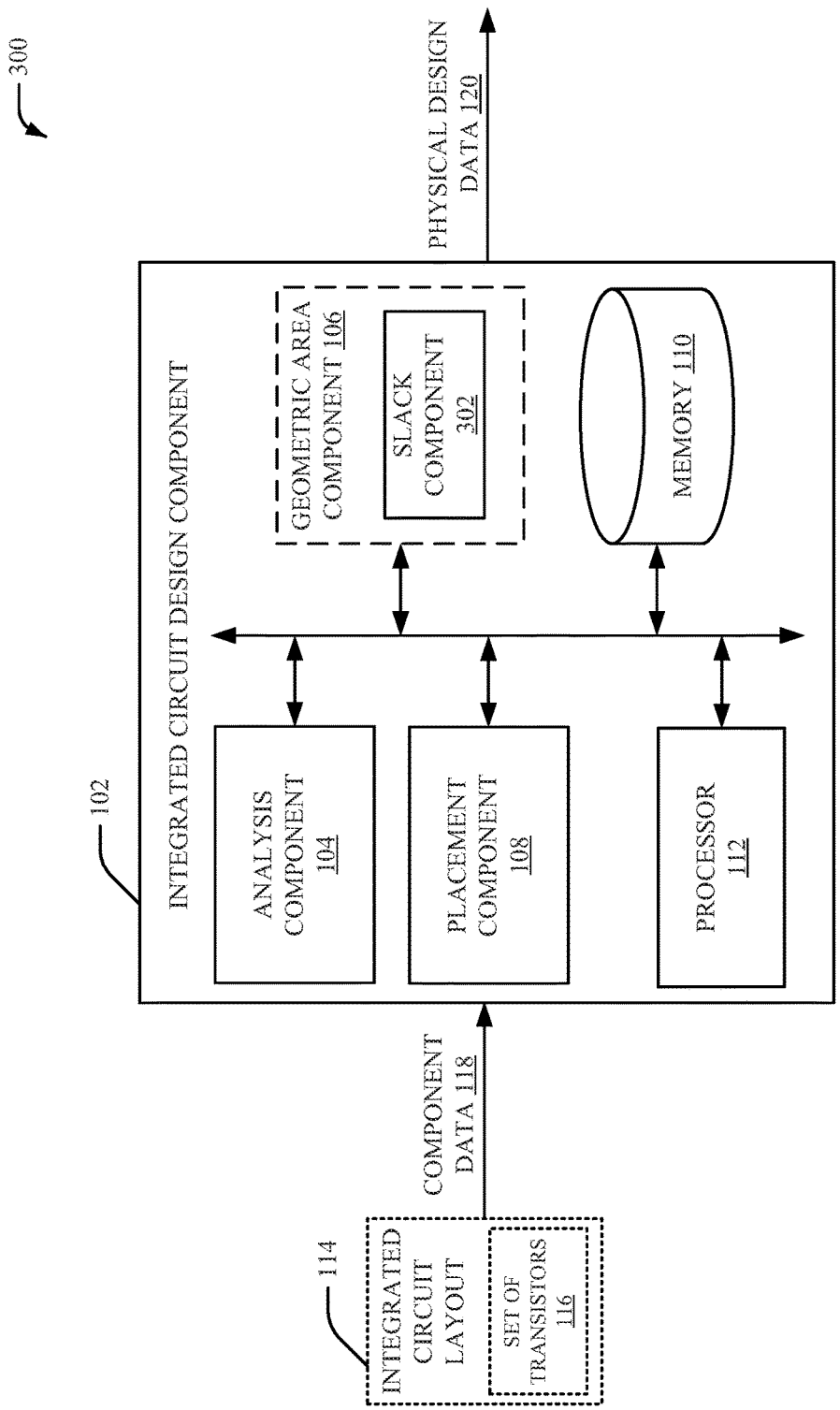
FIG. 3 illustrates a block diagram of yet another example, non-limiting system that includes an integrated circuit design component in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the integrated circuit design component 102. In certain embodiments, the system 300 also includes the integrated circuit layout 114. The integrated circuit design component 102 can include the analysis component 104, the geometric area component 106, the placement component 108, the memory 110 and/or the processor 112. As shown in FIG. 3, the geometric area component 106 can include a slack component 302. The slack component 302 can employ a set of slack timing values to determine a set of geographic areas for the integrated circuit layout 114 associated with the integrated circuit. In an aspect, slack component 302 can employ a pair-wise comparison of times between transistors from the set of transistors 116 to determine a set of geographic areas for the integrated circuit layout 114 associated with the integrated circuit. In an embodiment, the slack component 302 can employ the set of slack timing values to modify a size of geographic areas from the set of geographic areas for the integrated circuit layout 114. For instance, the slack component 302 can increase a size of geographic areas from the set of geographic areas based on the set of slack timing values. In another embodiment, the slack component 302 can employ the set of slack timing values to determine when a first geographic area intersects and/or abuts a second geographic area. In a scenario where a first geographic area intersects and/or abuts a second geographic area, the first geographic area can be separated from the second geographic area. However, a line segment of the first geographic area and the second geographic area can be shared when a first geographic area intersects and/or abuts a second geographic area.

Figure 4:
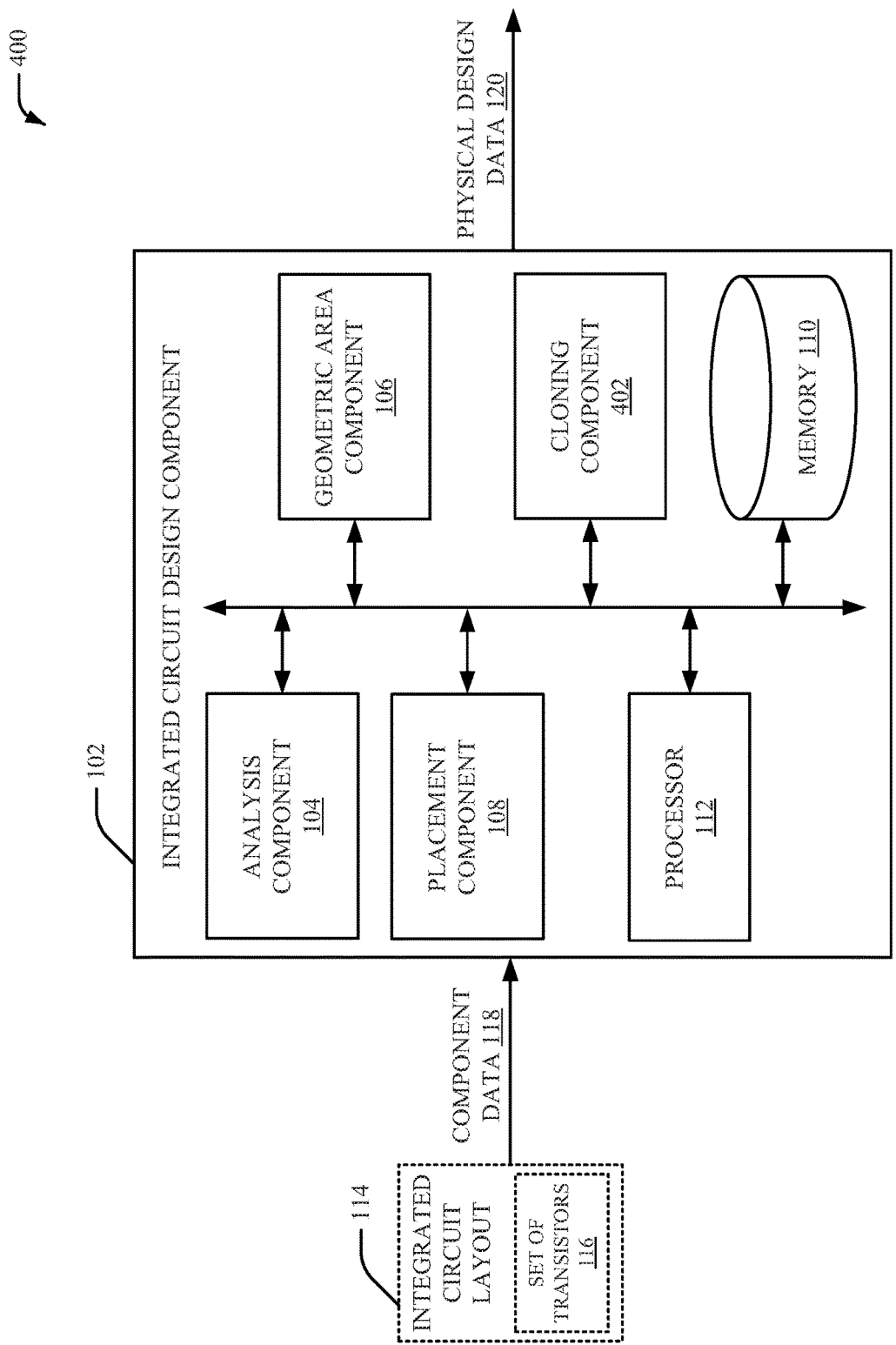
FIG. 4 illustrates a block diagram of yet another example, non-limiting system that includes an integrated circuit design component in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes the integrated circuit design component 102. In certain embodiments, the system 400 also includes the integrated circuit layout 114. The integrated circuit design component 102 can include the analysis component 104, the geometric area component 106, the placement component 108, a cloning component 402, the memory 110 and/or the processor 112. The cloning component 402 can perform cloning of one or more latch components to further improve timing characteristics of an integrated circuit obtained from a optimized placement of a latch component. For instance, the cloning component 402 can clone a latch component to generate a cloned latch component. The cloning component 402 can determine a second location for a second latch component on the integrated circuit based on the intersection between the first geometric area and the second geometric area. As such, the cloned latch component can drive a portion of the integrated circuit (e.g., a particular portion of fanout gates associated with the integrated circuit). In an aspect, the cloning component 402 can determine a number of latch components to be cloned. The cloning component 402 can also determine a slack timing value that can be achieved by cloning a latch component. Furthermore, the cloning component 402 can determine a number of transistor components to assign to a cloned latch component.

Figure 5:
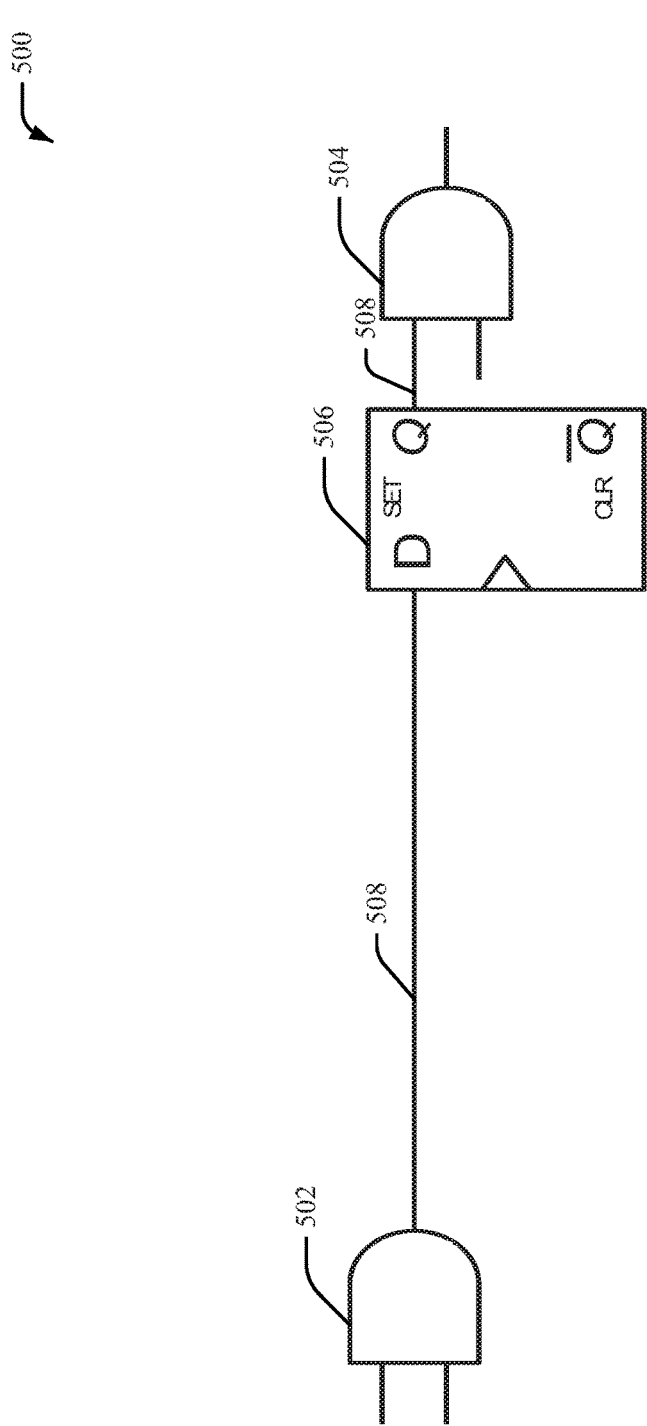
FIG. 5 illustrates an example, non-limiting system associated with time-driven placement of a component for an integrated circuit in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes a transistor component 502, a transistor component 504 and a latch component 506. In one example, the transistor component 502 and the transistor component 504 can be included in the set of transistors 116. The integrated circuit design component 102 can be employed to determine placement of the latch component 506 with respect to the transistor component 502 and the transistor component 504. For instance, the integrated circuit design component 102 can be employed to determine placement of the latch component 506 with respect to a wire 508 coupled to the transistor component 502 and the transistor component 504. The wire 508 coupled to the transistor component 502 and the transistor component 504 can be a physical electrical connection (e.g., copper line, an aluminum line, a metallic trace, etc.) between the transistor component 502 and the transistor component 504. As such, the transistor component 502 and the latch component 506 can be separated by a first wire length of the wire 508. Furthermore, the transistor component 504 and the latch component 506 can be separated by a second wire length of the wire 508. In a non-limiting example, the latch component 506 can be placed between the transistor component 502 and the transistor component 504 such that a first slack timing value between the transistor component 502 and the latch component 506 is equal to 0.3 nanoseconds and a second slack timing value between the transistor component 504 and the latch component 506 is equal to 0.1 nanoseconds. In an aspect, the latch component 506 can be an electronic component (e.g., an electronic device) that stores a single bit of data. For instance, the transistor component 502 can provide data (e.g., a bit value) to a D latch input of the latch component 506 via the wire 508 when a clock input associated with the latch component 506 is a logical high. Furthermore, the latch component 506 (e.g., Q output of the latch component 506) can provide output data to the transistor component 504 via the wire 508. In another aspect, the integrated circuit design component 102 can determine optimal placement of the latch component 506 with respect to the transistor component 502 and the transistor component 504 to provide improved timing characteristics and/or power characteristics for an integrated circuit associated with the integrated circuit layout 114.

Figure 6:
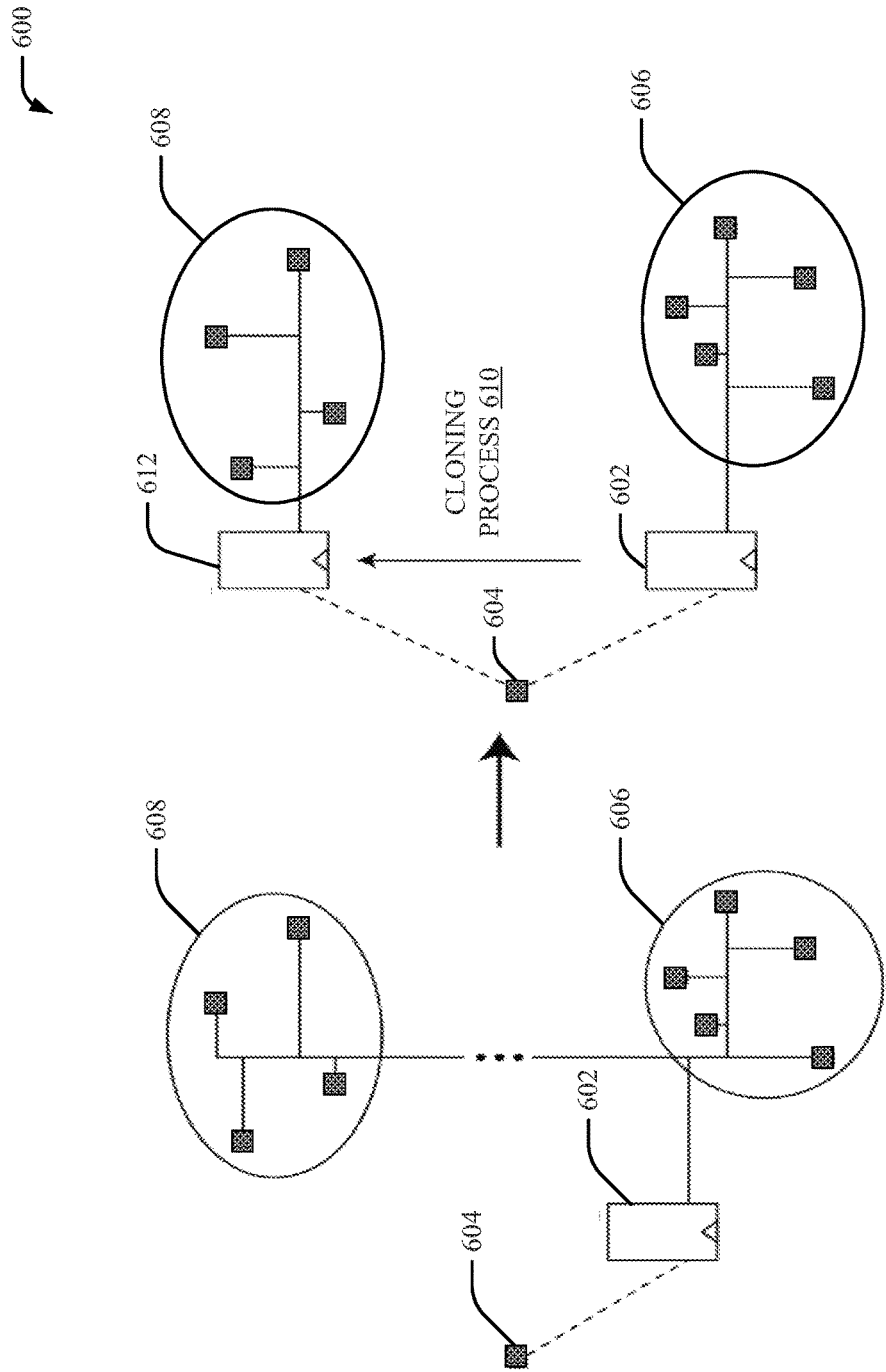
FIG. 6 illustrates an example, non-limiting system associated with time-driven placement and/or cloning of a component for an integrated circuit in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes a latch component 602. The latch component 602 can be electrically coupled to a transistor component 604, a set of transistor components 606, and a set of transistor components 608. In one example, the transistor component 604 can be a gate, the set of transistor components 606 can be a first group of gates, and the set of transistor components 608 can be a second group of gates. In another example, the set of transistor components 606 can be a first set of fanout gates and the set of transistor components 608 can be a second set of fanout gates. The transistor component 604 can correspond to a first portion of an integrated circuit, the set of transistor components 606 can correspond to a second portion of an integrated circuit, and the set of transistor components 608 can correspond to a third portion of an integrated circuit. During a cloning process 610 associated with the cloning component 402, the latch component 602 can be cloned into a cloned latch component 612. As such, in response to the cloning process 610, the latch component 602 can be electrically coupled to the transistor component 604 and the set of transistor components 606. Furthermore, in response to the cloning process 610, the cloned latch component 612 can be electrically coupled to the transistor component 604 and the set of transistor components 608. As such, in certain embodiments where the latch component 602 is driving multiple sets of transistors (e.g., multiple groups of gates), the latch component 602 can be cloned and placed to drive the multiple sets of transistors (e.g., the multiple groups of gates) separately. Therefore, with the cloning process 610, timing of the integrated circuit associated with the transistor component 604, the set of transistor components 606 and the set of transistor components 608 can be improved.

Figure 7:
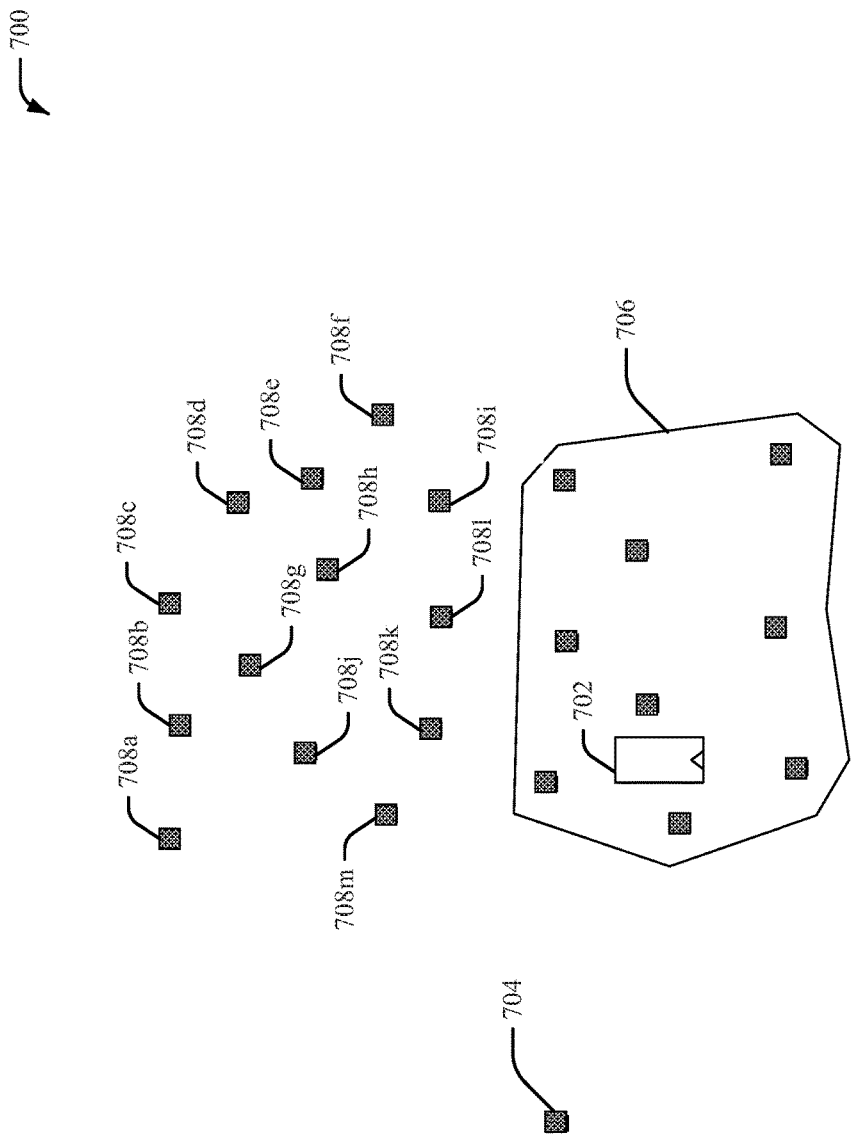
FIG. 7 illustrates an example, non-limiting system associated with an integrated circuit in accordance with one or more embodiments described herein.

FIG. 7 illustrates a block diagram of an example, non-limiting system 700 in accordance with one or more embodiments described herein. Repetitive description of like elements employed in other embodiments described herein is omitted for sake of brevity.

The system 700 can include a latch component 702. The latch component 702 can be electrically coupled to a transistor component 704. For instance, the transistor component 704 can be a source component for the latch component 702. In an embodiment shown in FIG. 7, the latch component 702 can also be electrically coupled to a set of transistors 706 and a set of transistors 708a-m. The set of transistors 706 and the set of transistors 708a-m can be a set of sink components for the latch component 702. In an aspect, the latch component 702, the transistor component 704, the set of transistors 706 and the set of transistors 708a-m can be implemented on an integrated circuit. Placement of the latch component 702 with respect to the set of transistors 706 and the set of transistors 708a-m can be determined by the integrated circuit design component 102 to facilitate optimized timing characteristics and/or optimized power characteristics for the integrated circuit that includes the latch component 702, the transistor component 704, the set of transistors 706 and the set of transistors 708a-m.

Figure 8:
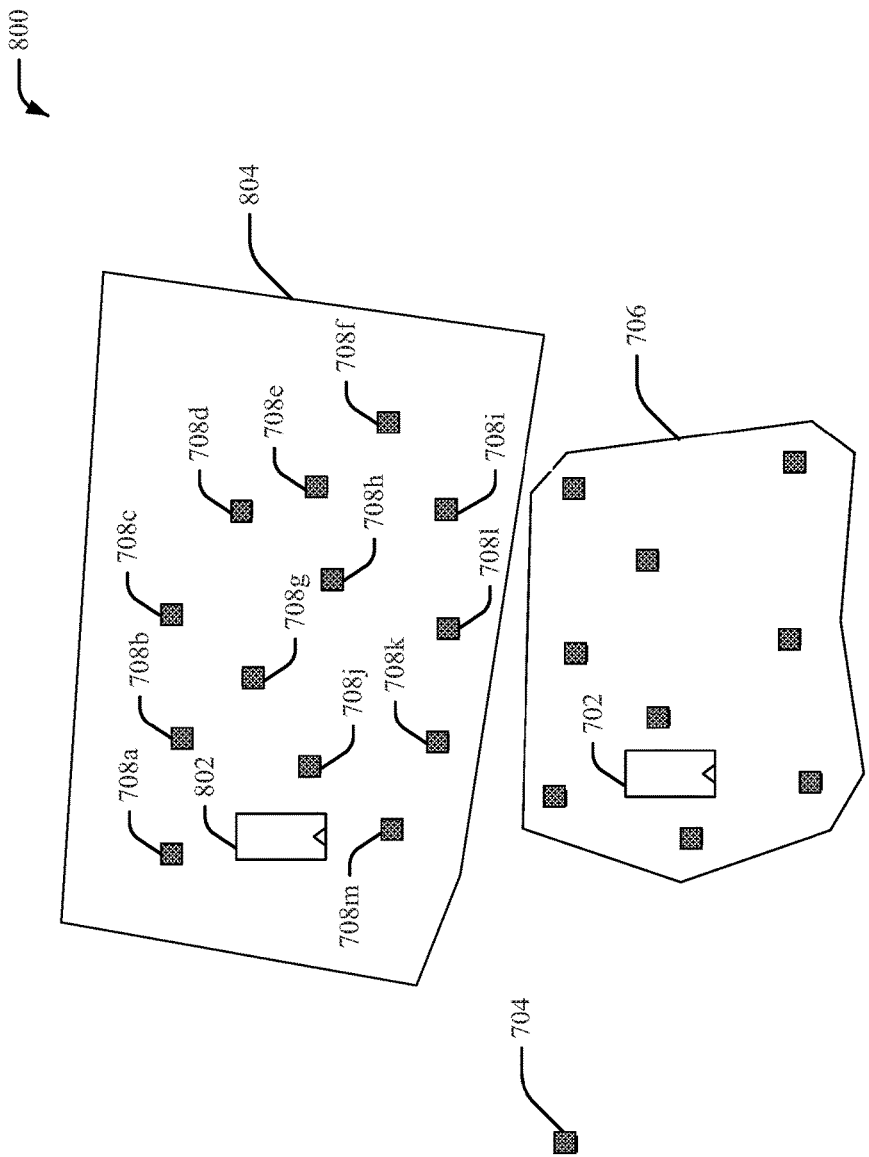
FIG. 8 illustrates another example, non-limiting system associated with an integrated circuit in accordance with one or more embodiments described herein.

FIG. 8 illustrates a block diagram of an example, non-limiting system 800 in accordance with one or more embodiments described herein. Repetitive description of like elements employed in other embodiments described herein is omitted for sake of brevity.

The system 800 can include the latch component 702. The latch component 702 can be electrically coupled to the transistor component 704. For instance, the transistor component 704 can be a source component for the latch component 702. In an embodiment shown in FIG. 8, the latch component 702 can be electrically coupled to the set of transistors 706. The set of transistors 706 can be a set of sink components for the latch component 702. Furthermore, the latch component 702 can be cloned to generate a cloned latch component 802. The cloned latch component 802 can be electrically coupled to the transistor component 704. For instance, the transistor component 704 can be also be a source component for the cloned latch component 802. The cloned latch component 802 can also be electrically coupled to the set of transistors 708a-m. The set of transistors 708a-m can be a set of sink components for the cloned latch component 802. In an aspect, the latch component 702, the cloned latch component 802, the transistor component 704, the set of transistors 706 and the set of transistors 708a-m can be implemented on an integrated circuit. Placement of the latch component 702 and the cloned latch component 802 on the integrated circuit can be determined by the integrated circuit design component 102 to facilitate optimized timing characteristics and/or optimized power characteristics for the integrated circuit that includes the latch component 702, the cloned latch component 802, the transistor component 704, the set of transistors 706 and the set of transistors 708a-m.

Figure 9:
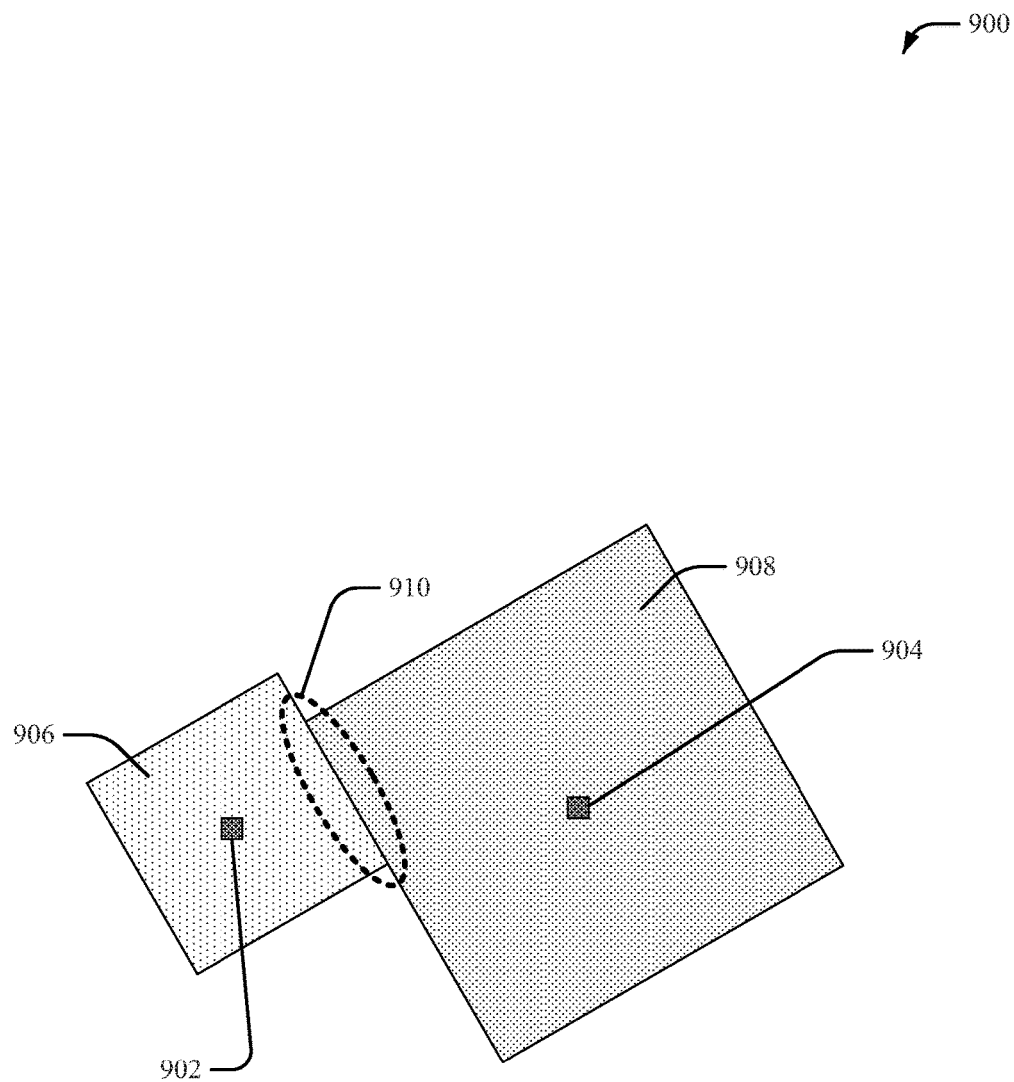
FIG. 9 illustrates yet another example, non-limiting system associated with an integrated circuit in accordance with one or more embodiments described herein.

FIG. 9 illustrates a block diagram of an example, non-limiting system 900 in accordance with one or more embodiments described herein. Repetitive description of like elements employed in other embodiments described herein is omitted for sake of brevity.

The system 900 can include a transistor component 902 and a transistor component 904. The transistor component 902 and the transistor component 904 can be implemented on an integrated circuit (e.g., an integrated circuit associated with the integrated circuit layout 114). The transistor component 902 can be associated with a geographic area 906 and the transistor component 904 can be associated with a geographic area 908. For instance, the transistor component 902 can be located at a center of the geographic area 906. Furthermore, the transistor component 904 can be located at a center of the geographic area 908. In an embodiment, the integrated circuit design component 102 can modify a size of the geographic area 906 and the geographic area 908 until the geographic area 906 and the geographic area 908 intersects and/or abuts at area 910. Furthermore, the integrated circuit design component 102 can place a latch component for the transistor component 902 and the transistor component 904 within the area 910 (e.g., at an intersection of the geographic area 906 and the geographic area 908).

Figure 10:
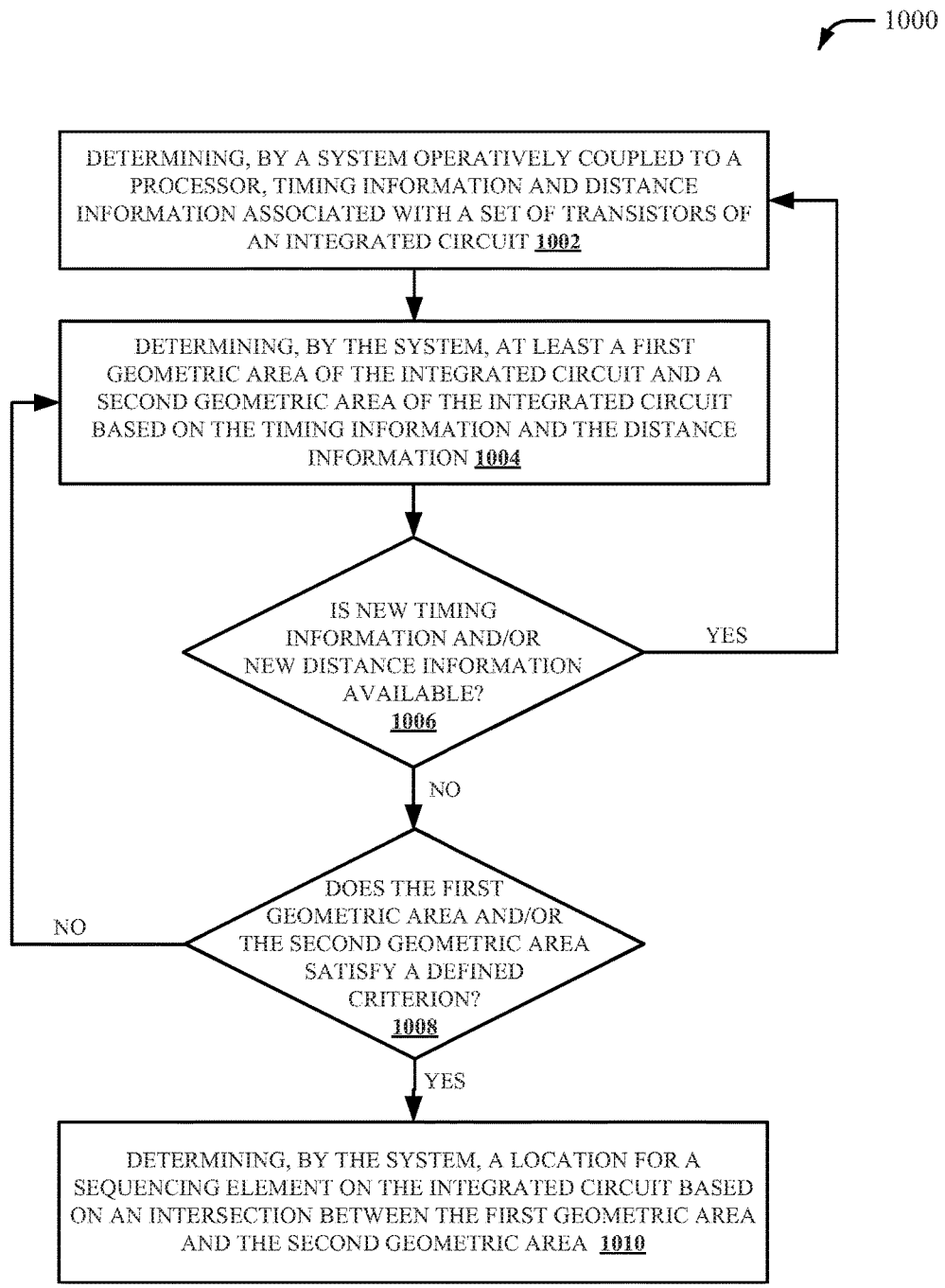
FIG. 10 illustrates a flow diagram of an example, non-limiting computer-implemented method for improving design of an integrated circuit in accordance with one or more embodiments described herein.

FIG. 10 illustrates a flow diagram of an example, non-limiting computer-implemented method 1000 for improving design of an integrated circuit in accordance with one or more embodiments described herein. At 1002, timing information and distance information associated with a set of transistors of an integrated circuit are determined by a system operatively coupled to a processor (e.g., by analysis component 104). The timing information can include, for example, a delay between the set of transistors of the integrated circuit. In one example, a linear delay model of a layout of the integrated circuit can be employed to determine interconnect delay between the set of transistors. The distance information can include, for example, a wire length between the set of transistors. In one example, a Manhattan distance technique can be employed to estimate wire-lengths between the set of transistors.

At 1004, at least a first geometric area of the integrated circuit and a second geometric area of the integrated circuit are determined, by the system (e.g., by geometric area component 106), based on the timing information and the distance information. The first geometric area can be associated with a first transistor from the set of transistors and the second geometric area can be associated with a second transistor from the set of transistors. For instance, the first transistor from the set of transistors can be located at a center of the first geometric area and the second transistor from the set of transistors can be located at a center of the second geometric area. In an aspect, a size of the first geometric area and a size of the second geometric area can be determined based on the timing information and the distance information.

At 1006, it is determined (e.g., by analysis component 104) whether new timing information and/or new distance information is available. If yes, methodology 1000 returns to 1002. If no, methodology 1000 proceed to 1008.

At 1008, it is determined (e.g., by geometric area component 106) whether the first geometric area and/or the second geometric satisfy a defined criterion. If no, methodology 1000 returns to 1004. If yes, methodology 1000 proceeds to 1010.

At 1010, a location for a sequencing element on the integrated circuit is determined, by the system (e.g., by placement component 108), based on an intersection between the first geometric area and the second geometric area. For instance, a location for a latch component on the integrated circuit can be determined based on an intersection between the first geometric area and the second geometric area. In one example, a size of the first geometric area and a size of the second geometric area can be modified (e.g., increased or decreased) until the first geometric area intersects the second geometric area.

Figure 11:
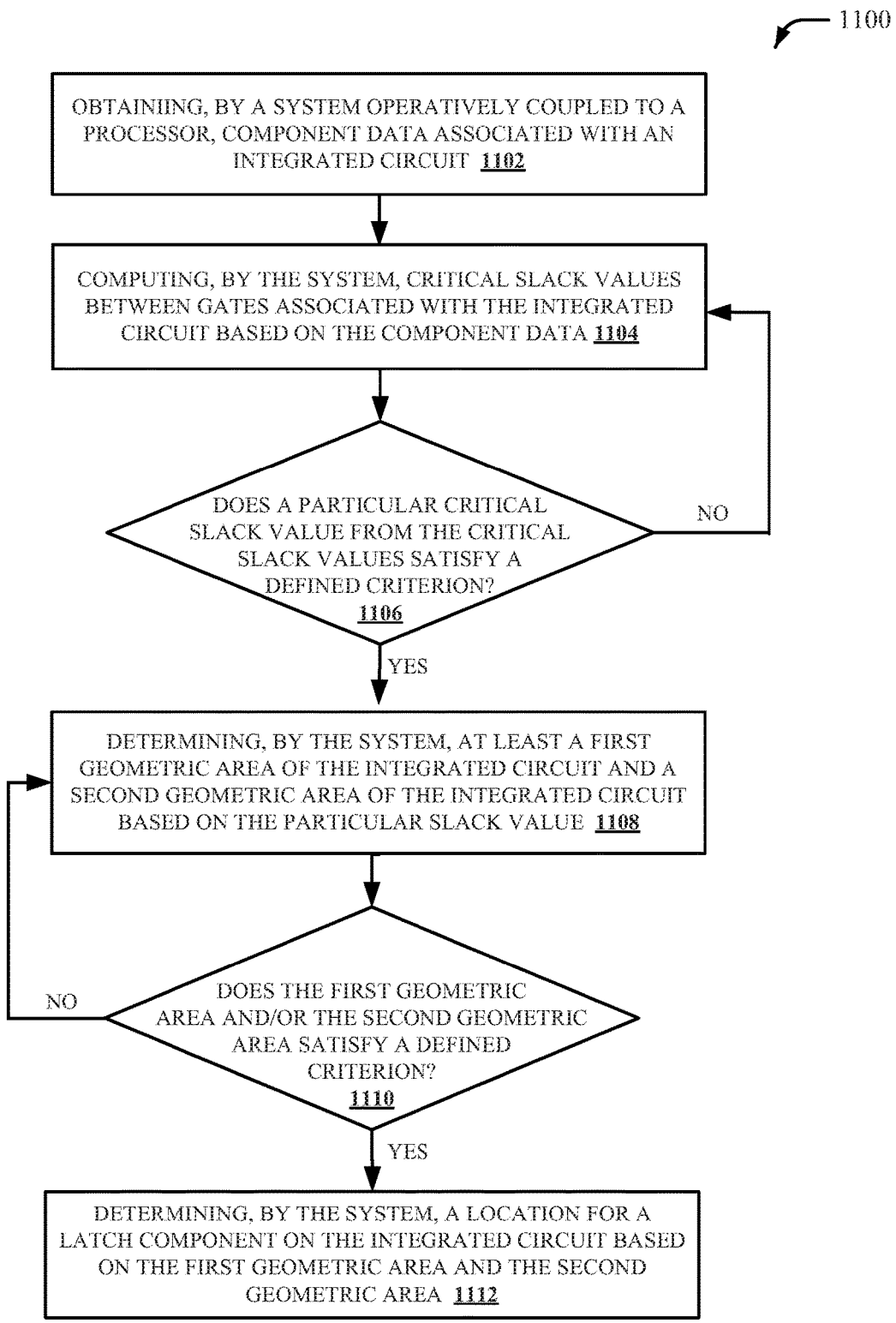
FIG. 11 illustrates a flow diagram of another example, non-limiting computer-implemented method for improving design of an integrated circuit in accordance with one or more embodiments described herein.

FIG. 11 illustrates a flow diagram of an example, non-limiting computer-implemented method 1100 for improving design of an integrated circuit in accordance with one or more embodiments described herein. At 1102, component data associated with an integrated circuit is obtained by a system operatively coupled to a processor (e.g., by analysis component 104). The component data associated with an integrated circuit can include, for example, a location of a set of transistors associated with the integrated circuit, interconnections between a set of transistors associated with the integrated circuit, a total number of transistors included on the integrated circuit, specification information for a set of transistors associated with the integrated circuit and/or other information associated with a set of transistors included on the integrated circuit.

At 1104, critical slack values between gates associated with the integrated circuit are computed, by the system (e.g., by analysis component 104), based on the component data. The critical slack values can indicative of differences between an actual time and a desired time for a timing path between a set of transistors included on the integrated circuit.

At 1106, it is determined (e.g., by analysis component 104) whether a particular critical slack value from the critical slack values satisfies a defined criterion. If no, methodology 1100 returns to 1104. If yes, methodology 1100 proceeds to 1108.

At 1108, at least a first geometric area of the integrated circuit and a second geometric area of the integrated circuit are determined, by the system (e.g., by geometric area component 106), based on the particular slack value. For example, a size of the first geometric area and a size of the second geometric area can be determined based on the particular slack value. The first geometric area can be associated with a first transistor included on the integrated circuit and the second geometric area can be associated with a second transistor included on the integrated circuit.

At 1110, it is determined (e.g., by geometric area component 106) whether the first geometric area and/or second geometric area satisfies a defined criterion. If no, methodology 1100 returns to 1108. If yes, methodology proceeds to 1112.

At 1112, a location for a sequencing element on the integrated circuit is determined, by the system (e.g., by placement component 108), based on the first geometric area and the second geometric area. For instance, a location for a sequencing element on the integrated circuit can be determined based on an intersection between the first geometric area and the second geometric area. In one example, a size of the first geometric area and a size of the second geometric area can be modified (e.g., increased or decreased) until the first geometric area intersects the second geometric area. The sequencing element can be, for example, a latch component.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least determining timing information, determining distance information, obtaining component data, determining geometric areas of an integrated circuit, determining a location for a sequencing element (e.g., a latch component) on the integrated circuit, etc. are established from a combination of electrical and mechanical components and circuitry, a human is unable to replicate or perform processing performed by the integrated circuit design component 102 (e.g., the analysis component 104, the geometric area component 106, the placement component 108, the timing component 202, the distance component 204, the slack component 302 and/or the cloning component 402) disclosed herein. For example, a human is unable to determine an optimal geometric area associated with an integrated circuit, determine an optimal location for a sequencing element (e.g., a latch component) on an integrated circuit based on geometric area, perform a machine learning process associated with determining a geometric area and/or placement of a sequencing element (e.g., a latch component) on an integrated circuit.

Figure 12:
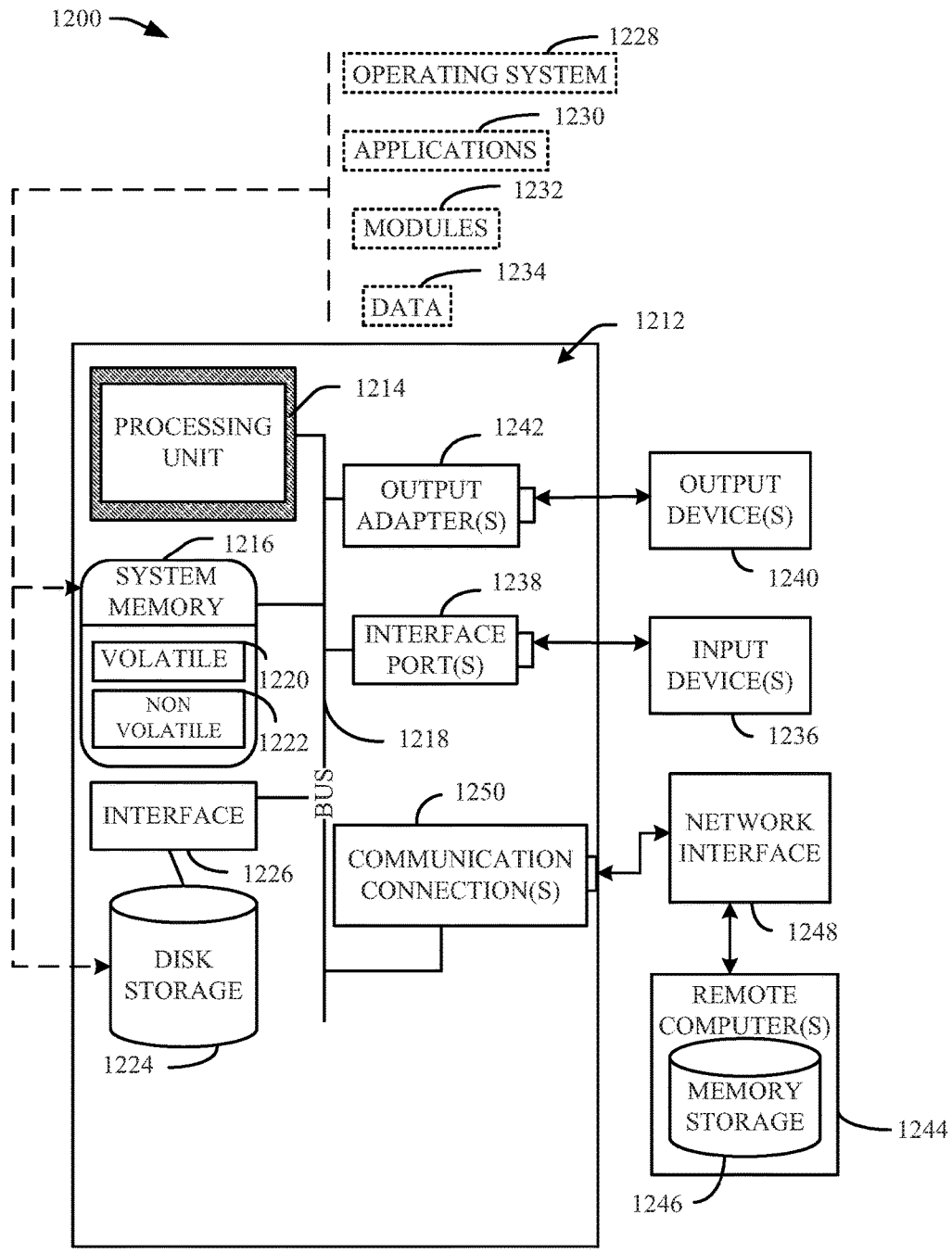
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media. To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212.

System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes computer executable components stored in the memory, wherein the computer executable components comprise:
      an analysis component that computes timing information and distance information between a set of transistor components of an integrated circuit;
      a geometric area component that determines at least a first geometric area of the integrated circuit and a second geometric area of the integrated circuit based on the timing information and the distance information; and
      a placement component that:
         determines a location for a latch component on the integrated circuit that improves at least one timing characteristic of the integrated circuit based on an intersection between the first geometric area and the second geometric area, and
         presents an integrated circuit layout with the latch component at the location on the integrated circuit.

2. The system of claim 1, wherein the analysis component determines a slack timing value between the set of transistor components that satisfies a defined criterion, and wherein the geometric area component determines at least the first geometric area of the integrated circuit and the second geometric area of the integrated circuit based on the slack timing value.

3. The system of claim 1, wherein the latch component is a first latch component and the location is a first location on the integrated circuit, wherein the computer executable components further comprise a cloning component that clones the first latch component to generate a second latch component, and wherein the cloning component determines a second location for a second latch component on the integrated circuit based on the intersection between the first geometric area and the second geometric area.

4. The system of claim 3, wherein the cloning component determines a first set of transistor components associated with the first latch component and a second set of transistor components associated with the second latch component based on the intersection between the first geometric area and the second geometric area.

5. The system of claim 1, wherein the geometric area component determines a total number of geometric areas of the integrated circuit based on the timing information and the distance information.

6. The system of claim 1, wherein the first geometric area comprises a first portion of transistors from the set of transistor components and the second geometric area comprises a second portion of transistors from the set of transistor components.

7. The system of claim 1, wherein the placement component determines the location for the latch component between a first transistor component and a second transistor component based on the intersection between the first geometric area and the second geometric area.

8. The system of claim 1, wherein the location for the latch component facilitates optimized timing characteristics for the integrated circuit.

9. A computer program product for improving design of an integrated circuit, the computer program product comprising a computer readable storage medium having program instructions embodied therewith, the program instructions executable by processor to cause the processor to:
   determine, by the processor, timing information and distance information associated with a set of transistors for an integrated circuit layout associated with an integrated circuit;
   determine, by the processor, at least a first geometric area of the integrated circuit layout and a second geometric area of the integrated circuit layout based on the timing information and the distance information; and
   determine, by the processor, a location for a sequencing element on the integrated circuit layout that improves at least one timing characteristic of the integrated circuit based on an intersection between the first geometric area and the second geometric area; and
   presenting, by the processor, the integrated circuit layout with the sequencing element at the location on the integrated circuit.

10. The computer program product of claim 9, wherein the program instructions are further executable by the processor to cause the processor to:
    determine, by the processor, a slack timing value between the set of transistors that satisfies a defined criterion; and
    determine, by the processor, at least the first geometric area of the integrated circuit and the second geometric area of the integrated circuit based on the slack timing value.

11. The computer program product of claim 9, wherein the sequencing element is a first sequencing element and the location is a first location on the integrated circuit, and wherein the program instructions are further executable by the processor to cause the processor to:
    duplicate, by the processor, the sequencing element to generate a second sequencing element; and
    determine, by the processor, a second location for a second sequencing element on the integrated circuit layout based on the intersection between the first geometric area and the second geometric area.

12. The computer program product of claim 11, wherein the program instructions are further executable by the processor to cause the processor to:
    determine, by the processor, a first set of transistors for the first sequencing element based on the intersection between the first geometric area and the second geometric area; and determine, by the processor, a second set of transistors associated with the second sequencing element based on the intersection between the first geometric area and the second geometric area.

13. The computer program product of claim 11, wherein the program instructions are further executable by the processor to cause the processor to:
determine, by the system, the timing information and the distance information based on analysis of the integrated circuit layout.

14. The computer program product of claim 9, wherein the program instructions are further executable by the processor to cause the processor to:
determine, by the processor, the location for the sequencing element between a first transistor and a second transistor from the set of transistors based on the intersection between the first geometric area and the second geometric area.

\* \* \* \* \*